United States Patent [19]
Tane et al.

[11] Patent Number: 5,456,129
[45] Date of Patent: Oct. 10, 1995

[54] LUBRICATING OIL SUPPLY APPARATUS FOR HYDRAULICALLY OPERATED VEHICULAR TRANSMISSION

[75] Inventors: Toshiaki Tane; Yoshikazu Nemoto; Atsuhiro Sakai, all of Wako, Japan

[73] Assignee: Honda Giken Kogyo Kabushiki Kaisha, Tokyo, Japan

[21] Appl. No.: 266,379

[22] Filed: Jun. 27, 1994

[30] Foreign Application Priority Data

Aug. 20, 1993 [JP] Japan .................................. 5-206428

[51] Int. Cl.$^6$ ..................... F16H 57/04; F16H 59/72; F16H 61/00
[52] U.S. Cl. ..................... 74/467; 475/159; 184/6.12

[56] References Cited

U.S. PATENT DOCUMENTS

| | | | |
|---|---|---|---|
| 4,526,054 | 7/1985 | Ehrlinger | 74/467 |
| 4,736,819 | 4/1988 | Muller | 184/6.12 |
| 5,222,418 | 6/1993 | Murota | 74/467 |
| 5,347,886 | 9/1994 | Mainquist et al. | 477/161 |
| 5,372,213 | 12/1994 | Hasebe et al. | 180/65.6 |

FOREIGN PATENT DOCUMENTS 60-69362  4/1985  Japan.

*Primary Examiner*—Dirk Wright
*Attorney, Agent, or Firm*—Armstrong, Westerman, Hattori, McLeland and Naughton

[57] ABSTRACT

A lubricating oil supply apparatus for a hydraulically operated vehicular transmission has a lubricating oil passage for supplying oil discharged from a discharge port of a pressure control valve which is provided in a hydraulic control circuit of the transmission to lubricating portions thereof as lubricating oil. The lubricating portions are divided into a plurality of groups depending on a change in a required amount of lubricating oil due to a temperature of the transmission. The lubricating oil passage is branched into a plurality of branches corresponding to the groups. The lubricating oil supply apparatus has a choke type of throttle which is disposed in at least one of the branches of the lubricating oil passage.

6 Claims, 2 Drawing Sheets

1

LUBRICATING OIL SUPPLY APPARATUS FOR HYDRAULICALLY OPERATED VEHICULAR TRANSMISSION

BACKGROUND OF THE INVENTION

1. Field of the Invention

The present invention relates to a lubricating oil supply apparatus for supplying lubricating oil to lubricating portions such as gear meshing portions, bearing portions, sliding portions, friction surfaces of hydraulic engaging elements, or the like of a hydraulically operated vehicular transmission.

2. Description of Related Art

As this kind of apparatus, there has hitherto been known one in which, as can be seen in Japanese Published Unexamined Patent Application No. 69362/1985, oil to be discharged from an oil discharge port of a pressure control value such as a regulator valve or the like which is provided in a hydraulic control circuit of a transmission, is supplied to lubricating portions of the transmission via a lubricating oil passage which is communicated with the oil discharge port.

In the above-described conventional apparatus, it is so arranged that a constant amount of lubricating oil is supplied to the lubricating portions regardless of the temperature of the transmission. Therefore, an unnecessarily large amount of lubricating oil is supplied when the viscosity thereof is high at a low temperature of the transmission. As a result, a friction increases and, consequently, the running performance decreases, or the specific fuel consumption becomes poor. Further, if lubricating oil of high viscosity is supplied to friction surfaces of hydraulic engaging elements, there will occur a dragging between the friction surfaces, with the result that there is a possibility of lowering the durability of the hydraulic engaging elements.

By the way, the change in the required amount of lubricating oil due to the temperature of the transmission varies in each lubricating portion. For example, a relatively large amount of lubricating oil is required to be supplied to the lubricating portions of high-speed transmission train side even at a low temperature of the transmission, but the amount of lubricating oil to be supplied to the lubricating portions of low-speed transmission train side may be small.

SUMMARY OF THE INVENTION

Taking note of the above-described point, the present invention has an object of providing a lubricating oil supply apparatus for a hydraulically operated transmission in which an adequate amount of lubricating oil can be supplied to respective lubricating portions depending on the temperature of the transmission, thereby eliminating the above-described disadvantages.

In order to attain the above and other objects, the present invention is a lubricating oil supply apparatus for a hydraulically operated vehicular transmission, the apparatus having a lubricating oil passage for supplying oil discharged from an oil discharge port of a pressure control valve which is provided in a hydraulic control circuit of the transmission, to lubricating portions as lubricating oil. The lubricating portions are divided into a plurality of groups depending on a change in a required amount of lubricating oil due to a temperature of the transmission. The lubricating oil passage is branched into a plurality of branches corresponding to the groups. The lubricating oil supply apparatus comprises thermosensitive type of flow control means which is disposed in at least one of the branches of the lubricating oil passage.

In case the lubricating portions are divided into, e.g., two groups depending on the size of the required amount of the lubricating oil at a low temperature of the transmission, i.e., one for a low-speed transmission train side and the other for a high-speed transmission train side, the flow control means, e.g., a choke type of throttle, is disposed in a lubricating oil passage which is branched to the lubricating portions for the low-speed transmission train side. The choke type of throttle is a throttle of the type that the length of the flow passage is large relative to the cross-sectional area of the flow passage. It follows that the higher the viscosity of the lubricating oil, i.e., the lower the transmission temperature, the smaller becomes the flow amount. According to this arrangement, the amount of the lubricating oil to be supplied to the lubricating portions of the low-speed transmission train side is reduced when the temperature of the transmission is low. Consequently, there can be prevented such disadvantages as an increase in the friction as well as a dragging of the hydraulic engaging elements of low-speed transmission trains due to the supply of unnecessarily large amount of lubricating oil of high viscosity to the lubricating portions of low-speed transmission train side.

If a relief valve is disposed in the lubricating oil passage on an upstream side of a portion where the lubricating oil passage is branched, the total flow amount of the lubricating oil can be restricted, and it can prevent the flow amount in the branch lubricating oil passage without flow control means from becoming excessive. As the pressure control valve, a regulator valve which regulates a pressure of oil from an oil source to a constant pressure can be used.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
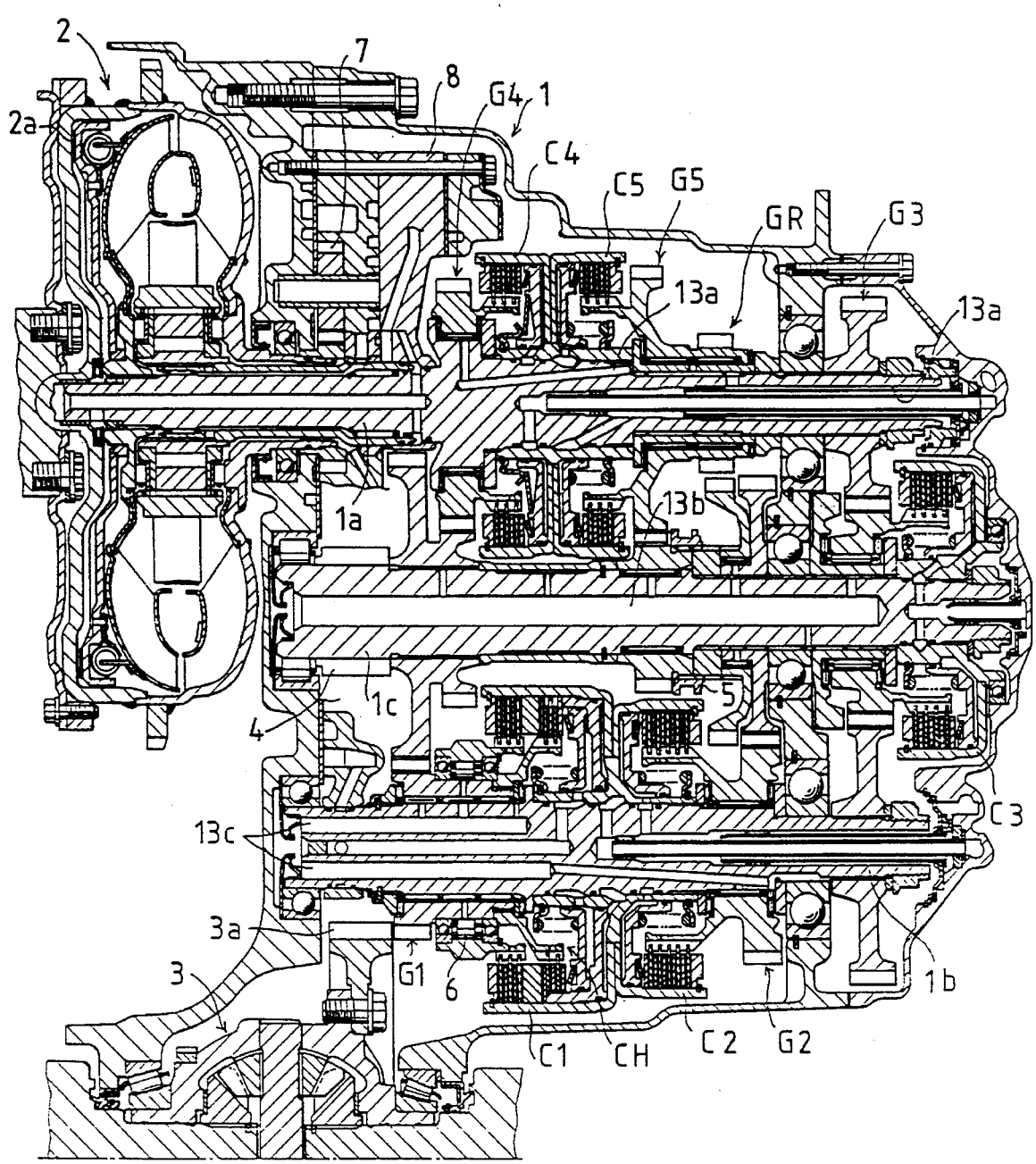
FIG. 1 is a developed sectional view of a transmission to which the present invention apparatus is applied.

Referring to FIG. 1, numeral 1 denotes a transmission for effecting the changing or shifting of the speed of a vehicle to five forward speeds and one reverse speed. This transmission 1 comprises a first input shaft 1a which is connected to an engine via a fluid torque converter 2 having a clutch 2a, a second input shaft 1b which is rotated synchronously with the first input shaft 1a, and an output shaft 1c which has an output gear 4 to be meshed with an input gear 3a of a differential gear 3. Between the second input shaft 1b and the output shaft 1c there are parallelly disposed transmission trains G1 and G2 for forward first speed and second speed, respectively. Between the first input shaft 1a and the output shaft 1c there are parallelly disposed transmission trains G3, G4, G5 for forward third speed through fifth speed, respectively, as well as a reverse transmission train GR. In these forward transmission trains there are interposed hydraulic engaging elements in the form of first-speed through fifth-speed hydraulic clutches C1, C2, C3, C4, C5, respectively, so that each of the forward transmission trains can be selectively established through engagement of each of the hydraulic clutches. The reverse transmission train GR is arranged to share the fifth-speed hydraulic clutch C5 with the fifth-speed transmission train G5 so that the fifth-speed transmission train G5 and the reverse transmission train GR can be selectively established by the changeover of a selector gear 5 on the output shaft 1c between the forward position on the left-hand side of the drawing and the reverse position on the right-hand side of the drawing. In the reverse transmission train GR there is interposed an unillustrated idle gear. In addition, the third-speed hydraulic clutch C3 is mounted on an end portion of the output shaft 1c so that the second input shaft 1b can be synchronously rotated with the first input shaft 1a via a gear train for the third-speed transmission train G3 on the input side of the hydraulic clutch C3 and a gear which is fixed to the second input shaft 1b and meshes with the gear train.

In the first-speed transmission train G1 there is provided a one-way clutch 6 which is interposed between the first-speed hydraulic clutch C1 and a gear train, on the output side thereof, for the first-speed transmission train G1 and which is a one-way transmission mechanism for allowing the overrunning of the output side. Furthermore, inside the first-speed hydraulic clutch C1 there is assembled a first-speed holding hydraulic clutch CH whose output side is directly connected to the gear train for the first-speed transmission train G1. The first-speed transmission train G1 can thus be established in a condition in which the overrunning of the output side is not allowed by the engagement of the hydraulic clutch CH, i.e., in a condition in which an engine braking can be applied.

Inside the casing of the transmission 1 there is provided a valve block 8 which has assembled therein a pump 7 as a hydraulic oil pressure source and various valves. Supplying and discharging of hydraulic oil to each of the above-described hydraulic clutches are arranged to be controlled by a hydraulic control circuit which is made up of the various valves assembled in the valve block 8.

Figure 2:
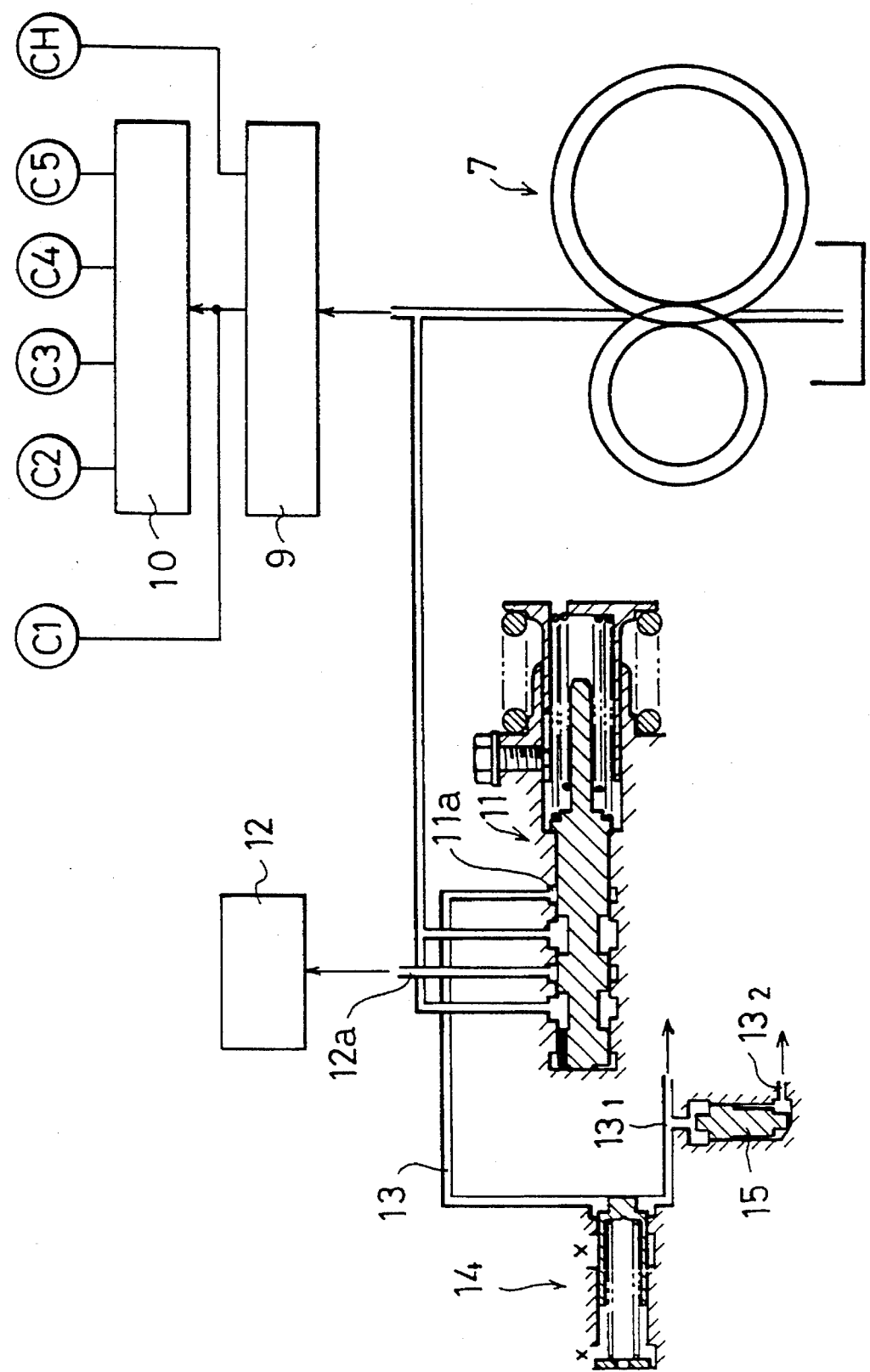
FIG. 2 is a circuit diagram showing a hydraulic control circuit thereof.

The hydraulic control circuit is provided, as shown in FIG. 2, with a manual valve 10 to supply pressurized oil from the pump 7 and a shift valve unit 9 which is on the downstream side thereof. In an automatic speed change position of the manual valve 9, the hydraulic oil is constantly supplied to the first-speed clutch C1. The supply and discharge of the hydraulic oil to and from the second-speed through the fifth-speed hydraulic clutches C2–C5 are also controlled by the shift valve unit 10 so that automatic speed changing of the first speed through the fifth speed can be effected. Though not illustrated, in the reverse running position of the manual valve 9, the hydraulic oil is supplied to the fifth-speed hydraulic clutch C5 via a servo valve which changes over the selector gear 5, thereby establishing the reverse transmission train GR. Further, in the first-speed holding position of the manual valve 9, the hydraulic oil is supplied to the first-speed holding hydraulic clutch CH, thereby establishing the first speed in a condition in which the engine brake can be applied.

In addition, the hydraulic control circuit is provided with a regulator valve 11 which regulates the pressure of the hydraulic oil to be supplied from the pump 7 to the manual valve 9 to a constant line pressure. Working oil (or operating fluid) is supplied from the regulator valve 11 to a hydraulic control circuit 12 for the clutch 2a of the fluid torque converter 2 via an oil passage 12a, and is also supplied from an oil discharge port 11a of the regulator valve 11 to the lubricating portions of the transmission via a lubricating oil passage 13.

The lubricating oil passage 13 is branched into a first branch oil passage $13_1$, and a second branch oil passage $13_2$. The first branch oil passage $13_1$ is made to be in communication with an oil bore 13a which is formed in the first input shaft 1a so as to lubricate the constituting members of the high-speed transmission trains of the fourth-speed transmission train and the fifth-speed transmission train. The second branch oil passage $13_2$ is made to be in communication with an oil bore 13c which is formed in the second input shaft 1b as well as with an oil bore 13b which is formed in the output shaft 1c so as to lubricate the constituting members of the low-speed transmission trains of the first-speed through the third speed transmission trains.

A relief valve 14 is disposed on an upstream side of the portion where the lubricating oil passage 13 is branched, and a choke type of throttle 15, which serves as a thermosensitive type of flow control means, is disposed in the second branch oil passage $13_2$.

According to this arrangement, when the temperature of the transmission becomes low with a consequent high viscosity of the oil, the amount of the oil to be supplied to the second branch oil passage $13_2$ is reduced by the choke type of throttle 15. There is, thus, prevented the supply of an unnecessarily large amount of high-viscosity oil to the lubricating portions on that side of the low-speed transmission trains which is covered by the second branch oil passage $13_2$. Therefore, there will occur no such disadvantage as an increased friction in the lubricating portions on the low-speed transmission train side at a low temperature of the transmission or as a dragging between the friction plates of the first-speed hydraulic clutch C1 or the second-speed hydraulic clutch C2.

By the way, a certain amount of lubricating oil must be supplied, even at a low temperature of the transmission, to the lubricating portions of the high-speed transmission trains. There will, however, be a fear that the amount of the oil to the first branch oil passage $13_1$ will increase due to the restriction by the choke type of throttle 15 of the flow to the second branch oil passage $13_2$ at the low temperature of the transmission, with the result that the lubricating oil to the lubricating portions of the high-speed transmission trains becomes excessive. However, as in the present embodying example, if the relief valve 14 is provided, the total amount of the oil to be used as the lubricating oil, out of the oil to be discharged from the regulator valve 11, is limited by the relief valve 14, thereby eliminating such a disadvantage as described above. Further, even at the low temperature of the transmission, the internal pressure of the lubricating oil passage 13 is maintained below the set pressure of the relief valve 14. Therefore, there is neither such as disadvantage that the line pressure rises due to the restriction of the oil discharge from the regulator valve 11.

Instead of the above-described choke type of throttle 15, it is possible to dispose in the second branch oil passage $13_2$ a throttle valve using a thermosensitive member such as a shape memory alloy, a bimetal or the like or a thermosensitive flow control means such as an electromagnetic valve or the like which responds to a temperature sensor. However, in order to simplify the construction, it is advantageous to use the choke type of throttle 15.

In the above-described embodying example, the lubricating portions are divided into two lubricating groups of high-speed transmission train side and the low-speed transmission train side in accordance with the size of the required amount of the lubricating oil at the low temperature of the transmission. It is, of course, possible to divide them into three groups or more.

As can be seen from the above description, according to the present invention, an adequate amount of lubricating oil can be supplied to the respective lubricating portions in accordance with the temperature of the transmission. The increase in friction and the dragging of the hydraulic engaging elements that may occur by supplying unnecessarily large amount of high-viscosity oil at the low temperature of the transmission, can be restrained. The running performance and the specific fuel consumption can be prevented from becoming poor, and the lowering of the durability of the hydraulic engaging elements can also be prevented.

It is readily apparent that the above-described lubricating oil supply apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A lubricating oil supply apparatus for a hydraulically operated vehicular transmission, said apparatus having a lubricating oil passage for supplying oil discharged from an oil discharge port of a pressure control valve which is provided in a hydraulic control circuit of said transmission, to lubricating portions thereof as lubricating oil, wherein said lubricating portions are divided into a plurality of groups depending on a change in a required amount of lubricating oil due to a temperature of said transmission, wherein said lubricating oil passage is branched into a plurality of branches corresponding to said groups, and wherein said apparatus comprises thermosensitive type of flow control means which is disposed in at least one of said branches of said lubricating oil passage.

2. A lubricating oil supply apparatus according to claim 1, wherein said lubricating portions are divided into those for low-speed transmission train side and those for high-speed transmission train side.

3. A lubricating oil supply apparatus according to claim 2, wherein said flow control means is disposed in a lubricating oil passage which is branched to said lubricating portions for the low-speed transmission train side.

4. A lubricating oil supply apparatus according to any one of claims 1 through 3, wherein said flow control means is constructed by a choke type of throttle.

5. A lubricating oil supply apparatus according to claim 4, further comprising a relief valve which is disposed in said lubricating oil pressure on an upstream side of portion where said lubricating oil passage is branched.

6. A lubricating oil supply apparatus according to claim 5, wherein said pressure control valve is a regulator valve which regulates a pressure of oil from an oil source to a constant pressure.

* * * * *